United States Patent
Albou et al.

(10) Patent No.: US 7,350,945 B2
(45) Date of Patent: Apr. 1, 2008

(54) SYSTEM AND METHOD OF DETECTING DRIVING CONDITIONS FOR A MOTOR VEHICLE

(75) Inventors: Pierre Albou, Bobigny Cedex (FR); Joël Lelevé, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/031,268

(22) Filed: Jan. 7, 2005

(65) Prior Publication Data
US 2005/0180149 A1 Aug. 18, 2005

(30) Foreign Application Priority Data
Jan. 9, 2004 (FR) .................................. 04 00149

(51) Int. Cl.
*B60Q 1/00* (2006.01)
(52) U.S. Cl. ...................... 362/507; 362/231; 362/543; 362/544; 362/259
(58) Field of Classification Search ................ 362/257, 362/259, 230, 231, 464, 475, 487, 543, 544, 362/545, 507; 348/487, 148, 162, 164, 207.99, 348/4.01
See application file for complete search history.

(56) References Cited

U.S. PATENT DOCUMENTS

| | | | |
|---|---|---|---|
| 4,931,767 A | 6/1990 | Albrecht et al. | |
| 5,499,168 A | 3/1996 | Cochard et al. | |
| 5,894,272 A | 4/1999 | Brassier et al. | |
| 5,926,164 A * | 7/1999 | Terakawa et al. | 382/104 |
| 6,108,084 A | 8/2000 | Winner | |
| 6,281,632 B1 * | 8/2001 | Stam et al. | 315/82 |
| 6,467,940 B2 * | 10/2002 | Eschler et al. | 362/510 |
| 6,601,980 B2 * | 8/2003 | Kobayashi et al. | 362/510 |
| 6,672,745 B1 * | 1/2004 | Bauer et al. | 362/545 |
| 6,817,740 B2 * | 11/2004 | Kobayashi et al. | 362/466 |
| 6,877,879 B2 * | 4/2005 | Holz et al. | 362/259 |
| 2003/0223246 A1 | 12/2003 | Albou | |

FOREIGN PATENT DOCUMENTS

| | | |
|---|---|---|
| EP | 505237 | 9/1992 |
| EP | 1369639 | 12/2003 |
| FR | 2676977 | 12/1992 |

* cited by examiner

Primary Examiner—Jacob Y. Choi
(74) Attorney, Agent, or Firm—Morgan & Finnegan, LLP

(57) ABSTRACT

A system for a motor vehicle for detecting driving conditions on a road, including a nebulosity, the range of visibility in the presence of a nebulosity or the distance between an obstacle in the road and the motor vehicle. The system includes a headlight which emits a visible light beam and an infrared light beam, at least one light sensor which receives at least a portion of the infrared beam reflected back to the vehicle, a optical device for directing at least a part of the reflected infrared beam to the light sensor and a device for detecting the modulated signal of the reflected infrared beam and determining at least one driving condition based on a comparison of the reflected infrared beam modulated signal and the corresponding emitted infrared beam modulated signal.

16 Claims, 3 Drawing Sheets

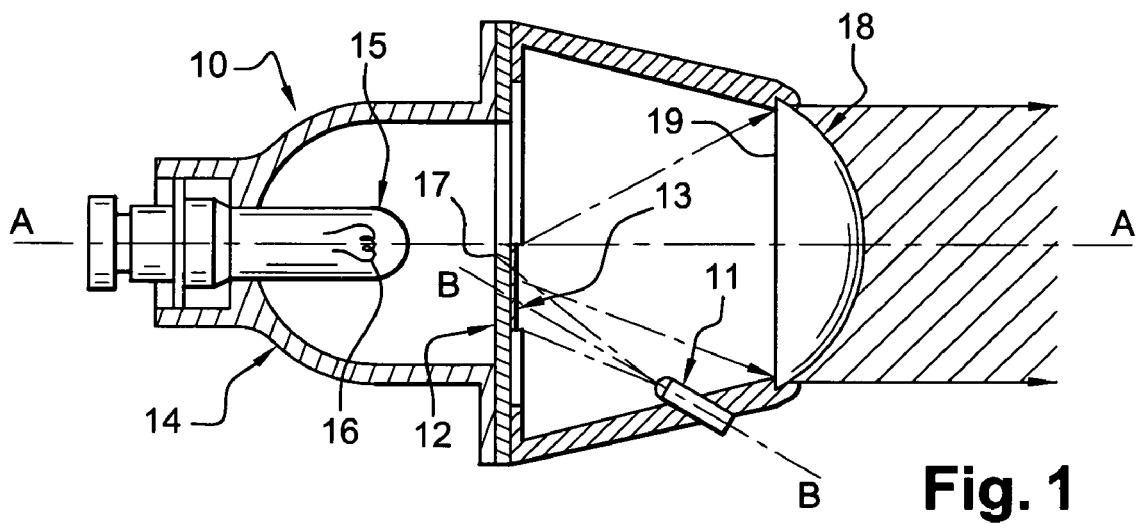
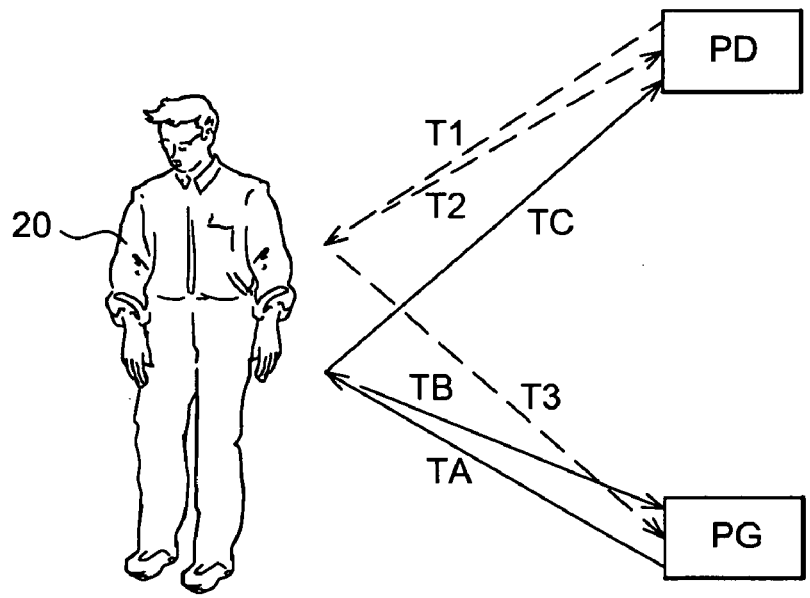

to left-hand sensor

SYSTEM AND METHOD OF DETECTING DRIVING CONDITIONS FOR A MOTOR VEHICLE

FIELD OF THE INVENTION

This invention relates to a system for detecting driving conditions on a road, for example weather conditions or, again, conditions relating to the proximity of another vehicle. This system is mounted on a motor vehicle. The invention also relates to a method performed by a said detection system.

The invention is applicable in the field of vehicles travelling on roads, and especially automotive vehicles. In particular, it finds applications in the field of projection of light on the road by such vehicles.

STATE OF THE ART

Having regard to the large number of vehicles travelling on roads, it is necessary to provide these vehicles with lighting which is adapted as well as possible to the prevailing conditions for driving. In particular, at night or in bad weather (such as in fog, rain, snow and so on), it is important that the driver is able to have the best possible view of the road extending in front of him. In other words, for safety reasons what is looked for is an improvement in the lighting of the scene visible along the road in front of the vehicle (hereinafter referred to as the roadscape ahead), and an increase in the amount of information supplied to the driver as to the driving conditions.

In order to improve the view of the roadscape ahead, there do exist a large number of suitable forms of vehicle mounted apparatus which are adapted to supply the driver with an image of the roadscape ahead in poor visibility, for example at night. However, incorporation of all of the lighting functions which are now installed on vehicles, as well as all the functions of driving assistance, such as display of images of the roadscape ahead, involves the occupation of a large amount of space, and in particular, lighting headlamps of large size which are used in achieving these functions. Manufacturers of headlights for vehicles therefore seek, while incorporating a number of major lighting functions, to avoid increasing the visible surface area of headlights on the front of the vehicle.

In order to overcome this space disadvantage, there is a motor vehicle lighting headlight which incorporates, at the same time, both a light source which supplies light in the visible spectrum, and a light source which provides an infra red light. Such a headlight is shown in FIG. 1. This headlight includes, in this order going from the rear towards the front along a longitudinal optical axis, an elliptical reflector 14, a main light source 16 arranged close to the first focus of the reflector, a mask 12 which includes a cut-off edge formed in the vicinity of a second focus of the reflector, so as to define a cut-off in the lighting beam produced by the headlight 10, and a convergent main lens 18, which has a focal plane passing close to the second focus of the reflector.

This headlight also includes a secondary light source 11 which is arranged between the mask and the main lens, together with an optical distribution element 13, which is arranged in front of the mask in such a way as to distribute the light rays emitted by the secondary light source on the input surface 19 of the main lens, so as to produce a secondary lighting beam.

The second light source of this headlight is a laser diode which emits an infra red lighting beam. This second light source is arranged axially between the mask 12 and the lens 18. The optical distribution element is arranged in front of the mask, in such a way as to distribute the light rays emitted by the diode 11 on the input surface 19 of the lens 18 with a view to producing a secondary light beam. The infra red light beam is generally used for the purpose of giving illumination axially in front of the passing or dipped light beam, and, in combination with an infra red camera, to form an image of any obstacles that may be detected in the roadscape ahead, on a control screen which is arranged in the cabin of the vehicle. Now, it should be noted that it is particularly difficult to incorporate an infra red lighting function, which is invisible, into a vehicle, because of the danger inherent in observation of infra red rays by a human eye.

In this headlight, the infra red light beam leaves via the same surface as the main light beam which is of visible light. For this purpose, the laser diode is arranged outside the path of the light rays emitted by the lamp 17 and passing the mask 12 in order to reach the input surface 19 of the lens 18. The laser diode includes an optical element which is arranged to direct at the optical distribution element 13 the infra red rays emitted by the laser diode. This optical element is for example a convergent lens, or again, an optical difraction element, such as a hologram, which is able to be stuck on the laser diode.

The infra red rays are therefore emitted from the output of the optical element, in a light diffusion direction B-B which is inclined with respect to the main optical axis A-A, and which is oriented from the diode 11 towards the optical distribution element 13, that is to say from front to rear.

The optical distribution element may be a reflector or an anisotropic diffuser, or again an isotropic diffuser. In the case of an anisotropic diffuser, this may include a support which is coated with an isotropic material, for example magnesium oxide, into which a network of elemental optical diffusion motifs are engraved. The diffuser can also be of the interference type. The optical distribution element 13 is so designed that it re-transmits the light which it receives in a controlled manner, in a solid diffusion angle. It may therefore be arranged close to the second focus of the lens 18, and so chosen that its solid diffusion angle generally corresponds to the solid angle defined by the second focus of the lens 18 with the input surface 19 of the lens. It is fixed on the front face of the occulting portion 17 of the mask 12, close to the main optical axis A-A.

In the case where the optical distribution element 13 is a diffuser (though this is also valid for other embodiments of this optical element), when the laser diode 12 is lit, it emits infra red rays which are directed on the front face of the diffuser 13. The latter re-transmits the infra red rays on to the input surface 19 of the lens 18. The laser diode is energised at the same time as the first light source. The infra red beam is therefore emitted in the dazzle zone of the passing beam. This positioning of the infra red beam enables drivers of vehicles travelling in the opposite direction, and pedestrians who are in the roadscape ahead, to avoid looking directly at the infra red beam, to an extent proportional to the pupillary reflex which is caused by the visible light rays emitted in the dazzle zone. This headlight therefore enables the risk of a person directly observing the infra red light beam without protection to be reduced, since the infra red source is isolated from outside by the lens 18 and the optical element. Such a headlight, projecting infra red light from a laser diode, has the advantage that it completely covers the relevant zone, that is to say the roadscape ahead which includes the road situated in front of the vehicle together with the verges of the road, without any sweeping action, and it avoids the risk that a person situated in the road ahead or in a vehicle travelling in the opposite direction may be able to look straight at the infra red light, with all its attendant dangers.

Associated with an infra red camera, this headlight enables an image of the roadscape ahead, showing the various obstacles which may be present in the roadscape ahead, to be thrown up on a monitor screen situated inside the vehicle.

However, this headlight does not enable the driver to know the distance between the obstacle and his vehicle when weather conditions are poor, especially in the presence of nebulosity, for example in foggy weather or wet weather. In this connection, as regards nebulosities, the apparatus described above does not enable the presence of an obstacle, for example another vehicle, to be detected. The driver may therefore think that there is no obstacle in the road ahead of him, with all the dangers that may be attendant on that. To know the distance is useful in clear weather, and this information may be made use of also by various automatic control systems. In addition, in bad weather the system may sometimes only be able to supply the distance of visibility, though this information is also important or relevant, for example in order to calculate a safe speed limit.

DISCLOSURE OF THE INVENTION

The invention accordingly has the object of providing a remedy to the disadvantages of the apparatus described above. To this end, the invention proposes a system which, in association with the headlight described above, enables the driving conditions on the road to be determined, for example the distance between an obstacle and the driver's vehicle, or the presence of fog or other weather conditions such as to cause the driver to modify his road behaviour.

For this purpose, the invention proposes to evaluate the passage time of the light between an instant of emission of the light, reflection of the said light on an obstacle, and its return to a light sensor, or, alternatively, the phase shift between a modulated emitted light beam and the retro-diffused light received. The distance between the obstacle and the light source is a function of this passage time, and also, if the appearance of the response signal has been modified as compared with the emitted signal, it is a function of the presence of fog or rain. In other words, the system of the invention enables either the distance of any obstacle that may be present in the absence of nebulosity to be detected, or else the presence of nebulosities to be determined or localised, and in that case, it enables the distance of visibility to be calculated.

To this end, the vehicle must be equipped with two headlights of the type described earlier herein, as well as at least one light sensor which enables a triangulation calculation to be carried out with the laser diodes of the headlights, so as to enable an obstacle that may be present ahead of the vehicle to be located both in horizontal distance and in azimuth.

More precisely, the invention provides a system for detecting driving conditions on a road, the system being mounted on a motor vehicle and comprising:

at least one illuminating headlight comprising a first light source for emitting a visible light beam, together with at least one second light source for emitting an infra red light beam towards a roadscape ahead, and at least one video camera for taking images of the roadscape ahead, characterised in that the infra red light beam carries an emitted modulated signal, especially a high frequency signal, and in that the system includes:

at least one light sensor which is adapted to receive the infra red light beam reflected by the roadscape ahead, optical means for directing at least part of the reflected infra red beam towards the said light sensor, and means for detecting, in the reflected infra red beam, a received modulated signal corresponding to the emitted modulated signal, and for determining the said driving conditions as a function of the passage time or phase shift and as a function of the form of the reflected infra red beam.

The system of the invention may include the following improvements:

the light sensor is a rapid photodetector, the optical means comprise collimating means of the objective or lens type, for forming an image of the roadscape ahead on the light sensor, the optical means comprise a reflector for reflecting at least part of the reflected infra red beam towards the video camera and towards the light sensor, the reflector is a semi-transparent wafer placed inside the camera, the sensor is integrated in the video camera or in the illuminating headlight, the second light source is a laser diode, the system includes two light sensors, each said sensor being integrated in a headlight of the vehicle or in a camera, the system includes two said second light sources, each of which is installed in a respective headlight and each of which is arranged to emit an infra red light beam, the two said infra red light beams being captured by at least one light sensor, the infra red light beam is modulated, continuously or in pulse modulation, the infra red beams emitted by the two said second light sources are modulated independently of each other.

This system has the advantage that it can be applied to an existing headlight, by incorporating elements which are relatively inexpensive.

The invention also provides the method which is performed by the system of the invention. This method comprises the following operations:

emission of at least one modulated infra red light beam, sensing of at least one infra red beam reflected by an obstacle or a nebulosity in the roadscape ahead, analysis of the reflected infra red beam, and determination, as a function of the passage time or phase shift and the form of the reflected infra red beam, of at least one of the following driving conditions:

the presence or absence of a nebulosity, the distance between any obstacle that may be present and the motor vehicle, and the maximum range of visibility in the presence of nebulosity.

Preferably, the method can include one or other of the following different alternatives:

the operation of determination of at least one driving condition makes use of triangulation between two second light sources and a light sensor, the said operation of determination makes use of triangulation between a second light source and two light sensors, the said operation of determination makes use of triangulation between two second light sources and two light sensors.

The invention also provides a vehicle which includes the detecting system of the invention.

BRIEF DESCRIPTION OF THE DRAWINGS

FIG. 1, which has been described above, shows a laser diode headlight in accordance with the prior art.

FIG. 2 shows diagrammatically the emission and sensing paths of the light beams in the system of the invention.

DETAILED DESCRIPTION OF AN EMBODIMENT OF THE INVENTION

Figure 3:
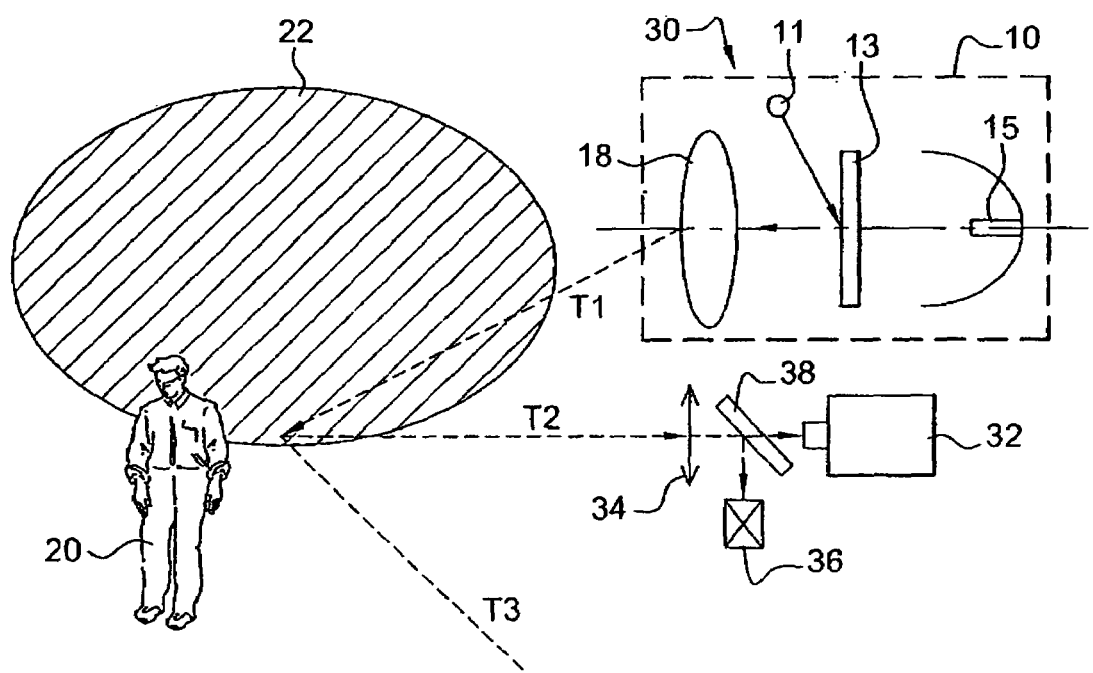
FIG. 3 shows the system for detecting driving conditions according to the invention.

The invention relates to a system which associates with the headlight of FIG. 1 a light sensor that enables a triangulation process to be carried out between the sensor and the laser diodes of the headlights. This system, with its emissions and its functions of sensing of light beams, is shown diagrammatically in FIG. 2.

FIG. 2 shows the right hand headlight PD and the left hand headlight PG of a vehicle. These headlights are headlights of the same type as that shown in FIG. 1. At least one of the said headlights includes at least one light source capable of being modulated, in particular at high frequency. This light source may be a laser source. In the embodiment of FIG. 2, the modulatable light source is a laser diode. In one modified version of the invention, two laser diodes are associated in a common headlight.

In the invention, this headlight is associated with at least one light sensor. The said light sensor may be incorporated in one of the headlights PD or PG. It may also be disposed otherwise than in a headlight, for example in the cabin of the vehicle behind the windshield, or, again, in a rear view mirror of the vehicle.

In the example shown in FIG. 2, the system of the invention has two laser diodes and two light sensors, each of which is incorporated in one headlight of the vehicle. In this case, when the lighting function of the vehicle is in operation, the laser diode and the headlight PD emits an infra red light beam along the path T1 towards the roadscape ahead. In the presence of an obstacle 20 in this roadscape, the infra red beam is reflected by the obstacle 20. The light sensor which is integrated in the headlight PD senses this reflected beam along a path T2. The sensor integrated in the headlight PG senses the same reflected beam along a path T3.

In parallel, the laser diode of the headlight PG emits an infra red light beam along the path TA towards the roadscape ahead. In the presence of an obstacle 20 in the roadscape ahead, the infra red beam is reflected by the obstacle 20. The light sensor incorporated in the headlight PG senses the reflected beam along a path TB. The sensor incorporated in the headlight PD senses the same reflected beam along a path TC.

A vehicle computer, which is connected to the light sensors, enables the passage time of the light beams emitted by the headlights PD and PG to be determined. In particular, the computer determines the passage time between the moment of emission of the IR (infra red) beam which is emitted by the headlight PD, its reflection on the obstacle on the path T2, and its reception by the sensor of the headlight PD. The determination of this passage time is a function of the distance from the obstacle to the light source, that is to say to the laser diode.

Similarly, the computer determines the passage time between the instant of emission of the beam IR emitted by the headlight PG, its reflection on the obstacle on the path TC, and its reception by the sensor of the headlight PD.

The distances between the obstacle and each of the laser diodes are determined by a triangulation method which will be described later herein.

Where the system has a single sensor, for example the one installed in the headlight PD, and two laser diodes (that is to say one in each headlight), it is possible to determine the passage time of each of the two beams IR, which enables the distances between the obstacle and each of the diodes to be determined.

Where the system has two sensors, each installed in one headlight, together with a single diode which may, for example, be mounted in the headlight PD, it is possible to determine the passage time of the single infra red beam between each of the two sensors, which enables the distance between the obstacle and each of the sensors to be determined.

Whatever the number of sensors and laser diodes in the system, the computer is able to determine, by triangulation, the positioning, both in horizontal distance and in azimuth, of an obstacle in the roadscape.

This triangulation technique consists in considering, in the case of two infra red beams, a first circular arc corresponding to the light beam emitted by the right hand headlight, and a second circular arc emitted by the left hand headlight, and in making the intersection between these two arcs so that the position of the obstacle, both in horizontal distance and in azimuth, is thereby determined.

Figure 4A:
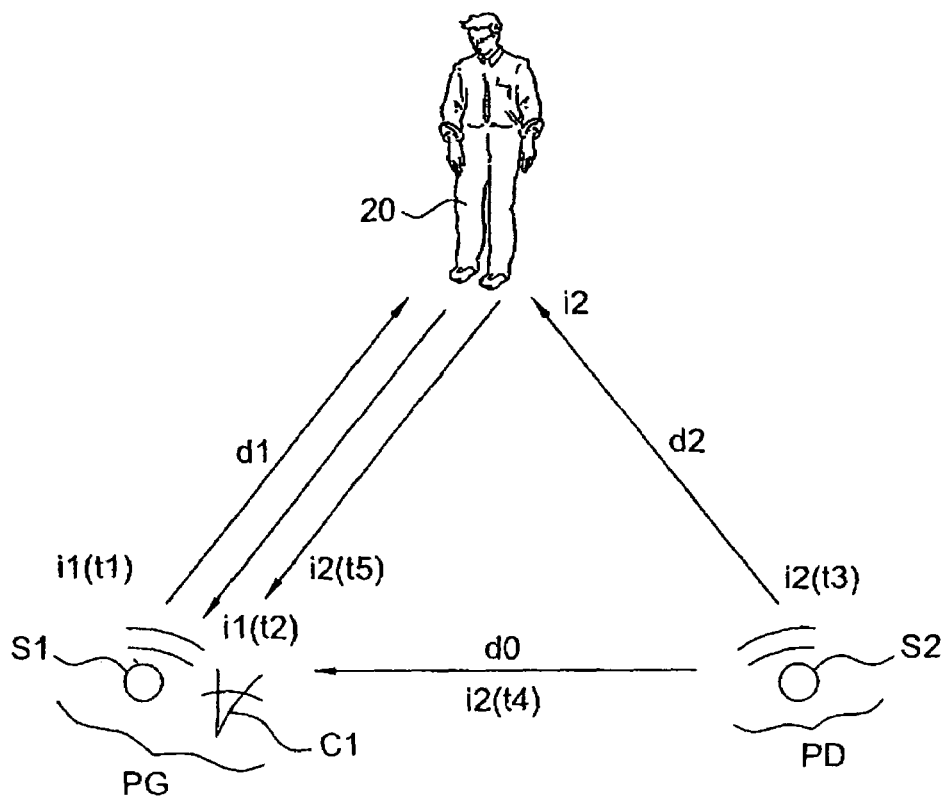
FIGS. 4A, 4B and 4C show diagrammatically three cases of triangulation which may be obtained with the system of the invention.
Figure 4B:
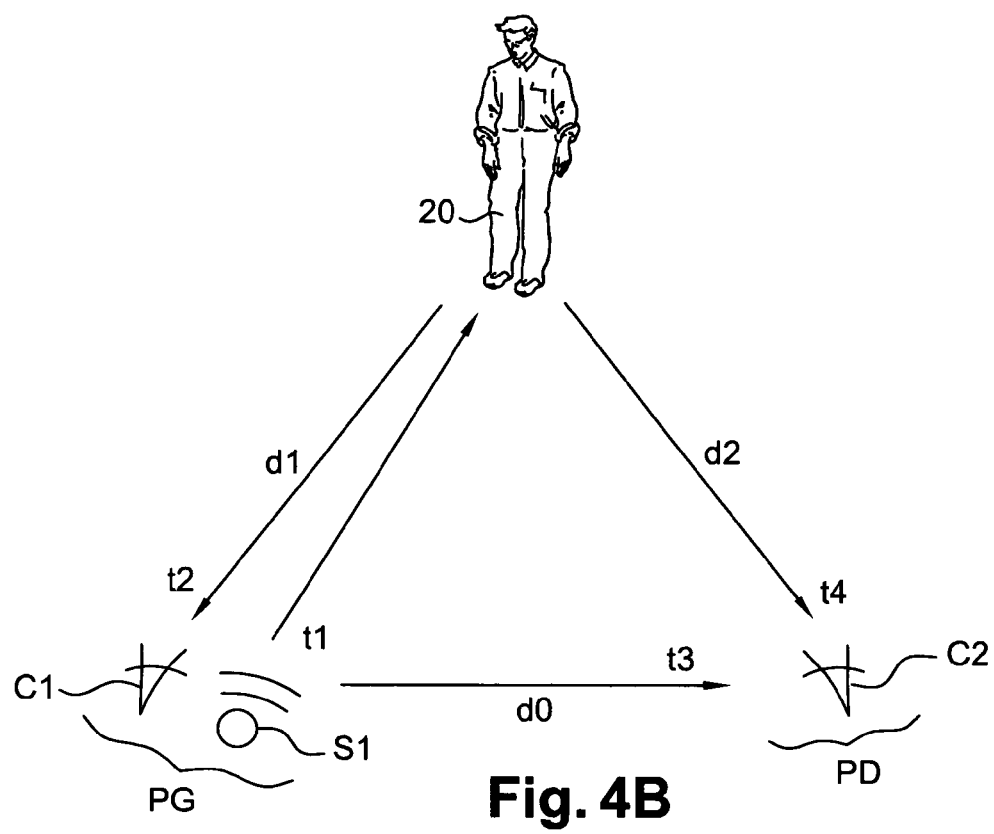
Figure 4C:
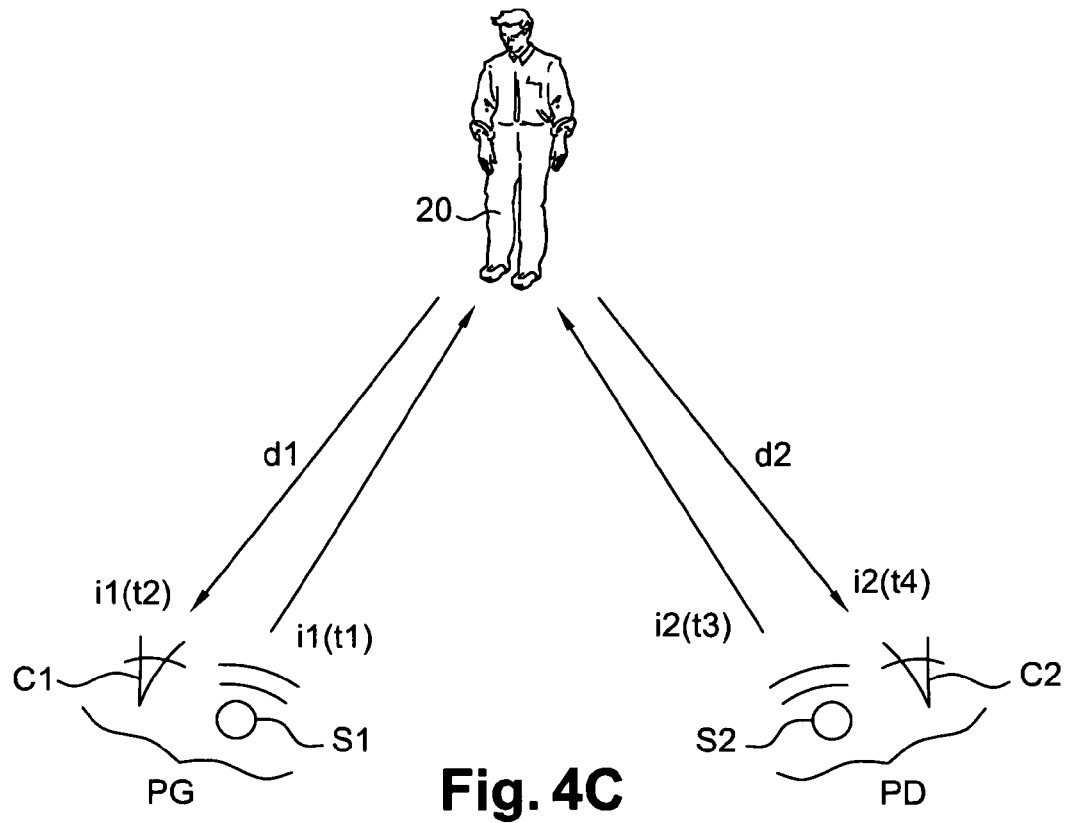

FIGS. 4A, 4B and 4C show three different cases of triangulation corresponding to three embodiments of the invention.

In the case of FIG. 4A, the system of the invention has a first laser diode S1 mounted in the headlight PG, a second laser diode S2 mounted in the headlight PD, and a sensor C1 mounted in the headlight PG. A distance d1 separates the headlight PG and the obstacle 20, a distance d2 separates the headlight PD and the obstacle 20, and a distance do separates the headlights PD and PG. A pulse i1 is emitted at a time t1 by the diode S1 towards the roadscape ahead; this pulse i1 is received at a time t2 by the sensor C1. A pulse i2 is emitted at a time t3 by the diode S2 towards the roadscape ahead; this pulse i2 is received at a time t5 by the sensor C1 after being reflected by the obstacle 20. This pulse i2 is received at a time t4 by the headlight PG, coming direct from the headlight PD. The pulse i2 (t4) is a return of information which has been transmitted, either freely by propagation in the air from one headlight to the other (optionally by means of prisms), or by fibre optic between the two headlights.

In the case of FIG. 4A, the sensor measures the passage time t1, t2, t4 and t5. The computer determines the following distance d1:

$$d1 = (t2 - t1) \times c/2,$$

where c is the velocity of light in the prevailing environment, and the computer also determines the following distance d2:

$$t3 = t4 - d0/c$$

and $$(t5-t3)c = d2+d1,$$

from which we get $d2=(t5-t4)c+d0-(t2-t1)c/2$.

The object is situated at the intersection of the two semi-circles, having radii d1 and d2, which are centered respectively on the headlights PG and PD.

In the case of FIG. 4B, the system of the invention has one laser diode S1, mounted in the headlight PG, a first sensor C1 mounted in the headlight PG and a second sensor C2 mounted in the headlight PD. A distance d1 separates the headlight PG from the obstacle 20, a distance d2 separates the headlight PD from the obstacle 20, a distance d0 separates the headlights PD and PG from each other. The infra red beam emitted by the diode S1 at the time t1 is received by the sensor C1 at the time t2, and, after being reflected on the obstacle 20, it is received by the sensor C2 at the time t4. The emission pulse of the beam is received at the time t3 by the headlight PD.

In the case of FIG. 4B, the sensor C1 measures the passage time t1 and t2, while the sensor C2 measures t3 and t4. The computer determines the distance d1 as follows:

$$d1=(t2-t1)\times c/2,$$

where c is the velocity of light in the prevailing environment, and the computer also determines the distance d2 as follows:

$$t1=t3-d0/c$$

and $$(t4-t1)c=d1+d2,$$

from which we get $(t4-t3)c+d0-(t2-t1)c/2=d2$.

In the case of FIG. 4C, the system of the invention includes, firstly one laser diode S1 and one sensor C1 in the headlight PG, and, secondly, one laser diode S2 and a second sensor C2 in the headlight PD. A distance d1 separates the headlight PG from the obstacle 20, and a distance d2 separates the headlight PD from the obstacle 20. The infra red beam emitted by the diode S1 at the time t1 is received by the sensor C1 at the time t2. The infra red beam emitted by the diode S2 at the time t3 is received by the sensor C2 at the time t4.

In the case of FIG. 4C, the sensor C1 measures the passage time t2, while the sensor C2 measures t4. The computer determines the distances d1 and d2 as follows:

$$d1=(t2-t1)\times c/2,$$

$$d2=(t4-t3)\times c/2.$$

In the case of FIG. 4C, there may be a feedback of information between the two headlights PG and PD. Thus, if one of the elements of the system is faulty, for example a laser diode or a sensor, the method of triangulation in FIG. 4A or 4B may be applied.

FIG. 3 shows a headlight associated with a light sensor according to the invention. This system 30 comprises a headlight 10 of the same type as that shown in FIG. 1, equipped with a light source 15 and with optical elements 13 and 18 as described above. Only one headlight is shown in FIG. 3. It will be well understood that a vehicle has two headlights, and that each of the two headlights can include a laser diode, each of which emits an infra red light beam. The two infra red beams may be captured by a common sensor, or by two distinct sensors, in order to permit measurement by triangulation as described above.

The headlight 10 also includes a laser diode 11 which emits an IR beam in the dazzle zone of the visible light beam. The headlight 10 illuminates the roadscape ahead with a beam 22 which consists of both visible radiation and infra red radiation. The lens 18 of the headlight enables this light beam to be directed towards the roadscape ahead in the usual direction for a passing or dipped beam headlight.

A video camera 32, which is preferably an infra red video camera, is associated with the headlight 10, and takes images of the roadscape ahead as illuminated by the beam 22. The camera 32 may be installed in the headlight 10, or it may be behind the windshield of the vehicle, or, again, on one or other of the rear view mirrors of the vehicle. Different positions are conventionally used for positioning this video camera. The system of the invention can be adapted for these conventional positions.

In accordance with the invention, optical means are used for the purposes of directing at least part of the reflected infra red beam towards the sensor or sensors. These optical means may be collimating means of the objective or lens type, which form an image of the roadscape ahead on the sensor. The said optical means may also be a reflector which reflects at least part of the reflected infra red beam to the camera and towards the sensor.

In one embodiment of the invention, the reflector is a semi-transparent wafer 38 incorporated in the camera and providing reflection for the IR beam reflected by the obstacle, simultaneously towards the camera 32 and towards the sensor 36. In this case, at least one sensor 36 is installed close to the camera 32. The sensor 36 may also be integrated in the camera. The semi-transparent wafer 38 enables the camera and sensor to be lit by the same IR beam. Thus, the camera 32 and sensor 36 are each able to process, separately, the same IR beam, whereby to show the images of the roadscape ahead on a screen and to determine the driving conditions, respectively.

The said semi-transparent film has the particular feature that it transmits the wavelength of the laser only towards the sensor. This film may be a multi-layer interference reflector, a bragg reflector, or the like. The wafer 38 may also be a glass strip with anti-reflective treatment, which enables good transmission of the visible light beam, towards the camera 32, to be obtained.

In the preferred embodiment of the invention, the light sensor 36 is a rapid photo-detector.

In the embodiment shown in FIG. 3, the sensor 36 and the semi-transparent wafer 38 are incorporated in the camera 32, just behind the objective lens 34 of the said camera. It should however be noted that the sensor 36 may be located outside the camera, though close to the latter so as to be able to capture the same reflected IR beam.

In a further embodiment, the sensor is incorporated in a headlight of the vehicle, and the camera is installed in the cabin of the vehicle. The optical means used for the purpose of directing the infra red beam towards the sensor is then not in the form of a semi-transparent wafer. This optical means may here be a lens or an objective.

In the example in FIG. 3, the headlight shown is the right hand headlight of the vehicle. As explained in connection with FIG. 2, a single sensor is necessary in order to determine the distance between the obstacle and the light source. This sensor may be placed in or close to the camera, which is itself integrated or otherwise in the right hand headlight. In that case, where the system of the invention includes two sensors, then each sensor is associated with one semi-transparent wafer and is installed close to a camera, in order that each sensor will receive the same IR beam as one of the cameras of the system.

The system of the invention, as it has just been described, performs the following method. When the visible light source 10 of the vehicle emits a visible light beam, the laser diode 11 simultaneously emits an infra red light beam. This IR beam is modulated and transmitted through the lens 18 along the path T1. The IR beam is reflected by the obstacle 20. The sensor 36 of the invention then measures the passage time of this beam from the obstacle 20 to the sensor, along the path T2. If the system of the invention includes a second sensor, then the reflection time of the signal from the obstacle 20 to the second sensor is also measured, along a path T3.

The system of the invention enables the time of travel, or passage time, of the IR beam to be measured as explained earlier herein, so that the distance between the obstacle and the vehicle can be deduced from it. It also enables the form of the sensed IR beam to be analysed, and enables weather conditions to be made from it, and more precisely the presence of nebulosity. To this end, the infra red beam emitted by the laser diode is modulated, either in pulses or continuously. On receipt of the IR beam reflected by the obstacle, the sensor analyses the form of this beam, that is to say it notes if the reflected beam has kept a modulation of the same form as that which it had on emission, or, whether its modulation has been modified. In other words, the system of the invention enables weather conditions to be detected by measurement of the return pulse, that is to say measurement of the time delay linked to exponential decrease in the intensity.

If the response to the signal has an exponential pattern increasing and then decreasing, the system then deduces from this that there is fog. In this connection, in foggy weather, a dispersion of the light beam is set up through each particle in suspension in the air. The captured beam is therefore diffracted. In this connection, it will be understood that, when the air is full of humidity, that is to say full of minute water particles in suspension, the light beam is reflected, not directly by the obstacle but by the various small particles of humidity in the path of the beam in front of the obstacle. The reflected beam therefore arrives very rapidly at the sensor, but is very fuzzy. The sensor is then able to deduce from this that there is humidity in the air and that it is fog. In the opposite case, if the light beam is passing in a transparent atmosphere, the signal is then reflected with approximately the same form, and it is sensed with some delay. In consequence, the appearance of the reflected beam gives information as to the nature of the humidity outside. It is accordingly possible, as a function of the form of the received beam, to determine the presence of fog or indeed the presence of rain or snow.

When fog is detected, the system calculates the maximum range of visibility, that is to say the distance up to which it is possible to detect an obstacle.

In the event of fog, the received infra red beam has an exponential form, and the amount of decrease of this exponential function enables the maximum visibility range to be known. In this connection, the denser the fog, and therefore the denser the air filled with particles in suspension, then the shorter will be the path travelled by the light beam. Thus, the denser the fog, the more will the wave front have an exponential appearance. On the other hand, if the fog is less dense, the wave front is straighter. When a signal of a different form is detected in the middle of this curve of exponential form, then it is deduced from this that a diffusing object is present. As a function of the difference between the form of the signal reflected by the object and the form of the surrounding reflected signal, the distance of the object with respect to the light source can be deduced therefrom.

In order to analyse the passage time and the deformation of the infra red beam between its emission and its capture by the sensor, the infra red beam must be modulated at its emission. In other words, the signal emitted by the laser diode is modulated. Where the system includes two laser diodes, each diode emits an infra red beam which is modulated independently of the other.

The IR beam may be pulse modulated, that is to say it is emitted in the form of a set of pulses having a certain period. In that case, the laser diode may be a saturable absorbent diode, which has the property of automatically producing short pulses.

The signal may also be continuously modulated. The reflected infra red beam is dephased with respect to the emitted beam, in proportion to the finite propagation velocity of the light. The measurement of the phase shift obtained, which is produced for example with the aid of a PLL, enables the distance at which the obstacle is situated to be deduced. Such continuous modulation enables good rejection of parasites to be obtained because of the synchronous demodulation.

Thus, in the case of pulse modulation, a passage time is measured in nanoseconds on the sensor. In the case of continuous modulation, the phase shift obtained is measured on reception by the sensor. Whichever kind of modulation is chosen, the appearance of the reflected signal remains the same, and accordingly provides the same indications as to the passage time of the infra red light.

The system of the invention, as has just been described, may be used for the purpose of confirming the presence of an obstacle detected by the camera, or the cameras in the case of a stereo video system, in order to make the information secure by fusion of data. A method for processing images may be carried out reciprocally, in parallel with the system of the invention, for the purpose of eliminating any possible aberrant information produced by the triangulation calculations and resulting for example from parasitic reflections or unwanted noise. In this connection, since the system of the invention makes use of headlights, in association with one or two video cameras, it is possible to make use of the images from these cameras in order to verify the data supplied by the light sensors.

The system of the invention can also be used for the purpose of drawing attention to a danger zone, on the image set up on the screen of the vehicle by the system for assisting vision. This information can also be used in automatic cruise control systems, for maintaining a constant distance between a vehicle in front and the vehicle which has the system of the invention. The same information can be used in anti-collision procedures, or even for verifying the safe distance corresponding to a time of 2 seconds between vehicles, a requirement which has recently appeared in the highway code.

What is claimed is:

1. A system for detecting driving conditions on a road, the system being mounted on a motor vehicle and comprising:
   (a) a headlight comprising:
      (i) a first light source for emitting a visible light beam from the headlight and
      (ii) a second light source for emitting an infrared light beam from the headlight, the infrared light beam emitted from the headlight having a first high frequency modulated signal;

(b) at least one light sensor which receives at least a part of the infrared light beam emitted from the headlight and reflected back to the motor vehicle, the part of the infrared light beam reflected back to the motor vehicle and received by the light sensor having a second high frequency modulated signal;

(c) an optical device which directs at least part of the infrared beam emitted from the headlight and reflected back to the to the motor vehicle towards the light sensor; and (d) a device which detects the second high frequency modulated signal of the part of the infrared light beam reflected back to the motor vehicle and received by the light sensor, and determines at least one driving condition based on a comparison of the second high frequency modulated signal of the part of the infrared light beam reflected back to the motor vehicle and received by the light sensor with the corresponding first high frequency modulated signal of the infrared light beam emitted from the headlight.

2. A system according to claim 1, wherein the light sensor is a rapid photodetector.

3. A system according to claim 1, wherein the optical device comprises collimating means of the objective or lens type, for forming an image of the road ahead on the light sensor.

4. A system according to claim 1 further comprising at least one video camera for taking images of the road in a region in front of the motor vehicle, wherein the optical device comprises a reflector for reflecting at least part of the infrared light beam emitted from the headlight and reflected back to the to the motor vehicle towards the video camera and towards the light sensor.

5. A system according to claim 4, wherein the reflector is a semi-transparent wafer placed inside the camera.

6. A system according to claim 1 further comprising at least one video camera for taking images of the road in a region in front of the motor vehicle, wherein the light sensor is integrated in the video camera or in the headlight.

7. A system according to claim 1, wherein the second light source is a laser diode.

8. A system according to claim 1 further comprising at least one video camera for taking images of the road in a region in front of the motor vehicle, wherein the at least one light sensor comprises two light sensors, each light sensor being integrated in the headlight of the vehicle or in the video camera.

9. A system according to claim 1 comprising two headlights and two second light sources, wherein each of the two second light sources is installed in a respective headlight and is arranged to emit an infrared light beam from the headlight, at least a part of the infrared light beams of the two second light sources emitted from the headlights and reflected back to the motor vehicle being received by at least one light sensor.

10. A system according to claim 9, wherein the infrared beams emitted by the two second light sources are modulated independently of each other.

11. A system according to claim 1, wherein the infrared light beam is modulated, continuously or in pulse modulation.

12. A vehicle comprising a system for detecting driving conditions on a road according to claim 1.

13. A method of detecting driving conditions for a motor vehicle on a road, comprising the steps of:

(a) emitting at least one modulated infrared light beam onto the road, the infrared light beam emitted onto the road having a first high frequency modulated signal;

(b) sensing at least a portion of the infrared light beam emitted onto the road and reflected back to the motor vehicle;

(c) detecting a second high frequency modulated signal of the infrared light beam reflected back to the motor vehicle; and (d) determining at least one driving condition based on a comparison of the second high frequency modulated signal of the infrared light beam reflected back to the motor vehicle with the corresponding first high frequency modulated signal of the infrared light beam emitted onto the road.

14. A method according to claim 13, wherein the step of determining the at least one driving condition makes use of triangulation between two second light sources emitting infrared light beams having high frequency modulated signals and a light sensor which senses at least a portion of the infrared light beams emitted from each of the two second light sources and reflected back to the motor vehicle.

15. A method according to claim 13, wherein the step of determining the at least one driving condition makes use of triangulation between a second light source emitting a infrared light beam having a high frequency modulated signal and two light sensors which each sense at least a portion of the infrared light beam emitted from the second light source and reflected back to the motor vehicle.

16. A method according to claim 13, wherein the step of determining the at least one driving condition makes use of triangulation between two second light sources emitting infrared light beams having high frequency modulated signals and two light sensors which each sense at least a portion of the infrared light beam emitted from one of the second light sources and reflected back to the motor vehicle.

* * * * *